United States Patent [19]

Wang

[11] Patent Number: 4,833,617
[45] Date of Patent: May 23, 1989

[54] SOLID MODELING BASED ADAPTIVE FEEDRATE CONTROL FOR NC MACHINING

[75] Inventor: Weiping Wang, Schenectady, N.Y.

[73] Assignee: General Electric Company, Schenectady, N.Y.

[21] Appl. No.: 85,483

[22] Filed: Aug. 14, 1987

[51] Int. Cl.$^4$ .............................................. G06F 15/18
[52] U.S. Cl. ........................ 364/474.15; 364/474.17; 364/474.24; 364/474.28; 364/578
[58] Field of Search .............................. 364/167–171, 364/474, 475, 578, 474.15, 474.17, 474.24, 474.28

[56] References Cited

U.S. PATENT DOCUMENTS

| | | | |
|---|---|---|---|
| 3,504,581 | 4/1970 | Weichbrodt et al. | 82/1 |
| 3,550,107 | 12/1970 | Thompson et al. | 340/267 |
| 4,513,366 | 4/1985 | Munekata et al. | 364/474 |
| 4,697,239 | 9/1987 | Sicard et al. | 364/474 |
| 4,736,306 | 4/1988 | Christensen et al. | 364/474 |
| 4,740,885 | 4/1988 | Gose et al. | 364/474 |

OTHER PUBLICATIONS

W. Wang, "Solid Geometric Modeling for Mold Design and Manufacture", TIS Report No. 84CRD122, May 1984, Corporate Research and Development, General Electric Company, Schenectady, New York.
W. P. Wang, K. K. Wang, "Geometric Modeling for Swept Volume of Moving Solids", IEEE CG&A, Dec. 1986, pp. 8–18.

Primary Examiner—Allen MacDonald
Attorney, Agent, or Firm—Donald R. Campbell; James C. Davis, Jr.; Paul R. Webb, II

[57] ABSTRACT

An adaptive feedrate control and method of optimizing the metal removal rate of NC end milling is based on a solid modeler which continuously simulates the in-process workpiece geometry in 3-dimensional machining. For each NC record representing a tool motion, an adjusted feedrate is generated off-line by the simulation running on a general purpose computer. The metal removal rate, cutting force, and tool deflection are calculated, and a feedrate is chosen to increase machine utilization without violating user-set constraints and avoid common machine problems such as excessive tool deflection and tool breakage.

15 Claims, 7 Drawing Sheets

SOLID MODELING BASED ADAPTIVE FEEDRATE CONTROL FOR NC MACHINING

BACKGROUND OF THE INVENTION

This invention relates to a system and method of providing an adaptive feedrate control in NC (numerical control) machine, such as end milling, using a solid modeling based simulation of the machining process.

End mills are widely used to machine complicated parts in the aerospace and mold/die industries, yet it is somewhat difficult to achieve high productivity in end milling. Machining intricate details on parts often calls for slender cutters of low rigidity, and the cutting forces in contouring can easily exceed the limit of the cutter. For instance, the resultant force can increase by more than a factor of ten in a simple cornering cut; such a critical region causes excessive tool deflection and tool breakage. The variation in cutting force is due to the variation of metal removal rate. Frequently the geometry of the part prevents constant radial and axial depths of cut. Consequently, feed per teeth recommended assuming a constant depth of cut does not perform satisfactorily and must be adjusted. Finding out the problem areas and applying proper feedrates, if done by the part progammer, is labor intensive. Sometimes a conservative feedrate override is applied to prevent tool breakage at the expense of under-utilizing the machine capability and reducing productivity.

Up to the present, hardware adaptive controllers have been devised to improve the productivity for limited operations; one has a force sensor to measure cutting force. The controller and sensors have to be installed on the NC machine tool. Such hardware is inflexible in handling diferent situations of tooling, material and set-up, because it does not have the ability to interface with CAD/CAM systems and to configure itself for different operations. In addition, systems operating in real time cannot look ahead.

Recently, a solid modeling system which can simulate end milling in real time has been developed and is called NCS. With the NC program as an input, it continuously models the in-process workpiece geometry as a solid. This is described in the inventor's Ph.D. Thesis, "Solid Geometric Modeling for Mold Design and Manufacturing", Cornell Univ., 1984 (TIS Report No. 84CRD122, May 1984, General Electric Co. is the same); and in the published paper authored with K. K. Wang, "Geometric Modeling for Swept Volume of Moving Solids", IEEE CG&A, December 1986, pp. 8–17, the disclosure of which is incorporated herein by reference.

SUMMARY OF THE INVENTION

An object of this invention is to provide dynamic cutting tool feedrates for numerically controlled machining without resorting to real-time sensors and controllers.

Another object is the provision of a system and method to adjust feedrates based on an off-line machining simulation using solid modeling, before the NC program is sent to the machine tool.

Yet another object is to improve the productivity of milling machines by adaptively changing the feedrate based on the material removed by each tool path.

By integrating the aforementioned solid modeling system with a machinability and a metal cutting model, the cutting force is evaluated as the tool removes material from the model of the workpiece. Based on the result of the simulation, the feedrate is automatically adjusted and is added to the NC codes before transfer to the machine tool controller. The system provides look-ahead capability which cannot be achieved by real-time controllers.

A method of determining an adaptive feedrate for a machine tool by a computer simulation of the machining process is as follows. A standard NC program is provided, having coded instructions defining a series of cutting tool motions to follow a tool path and machine a workpiece at a chosen baseline feedrate and cutting speed per instruction. Using the NC program as an input, the ion-process workpiece geometry is continuously modeled as a solid by subtracting the cutting tool swept volume from the current workpiece volume. For every tool motion the material removal rate, average cutting force and tool deflection are calculated. The metal removal rate is derived from the workpiece volume removed and time per motion; cutting force from the known specific energy to remove unit material, the metal removal rate and cutting speed; and tool deflection from certain physical parameters of the cutter and given that thrust force is about half of the cutting force. An adjusted feedrate per tool motion is selected to optimize productivity without violating predetermined user set constraints such as those on cutting force and tool deflection.

Other features of the method are that the feedrate adjustment is limited to a bounded range about the baseline feedrate, suitably 25–400% of the baseline value. There may be additional constraints that are not violated in selecting a maximum adjusted feedrate per tool motion, for example machine tool characeristics and surface finish.

Another aspect of the invention is an adaptive feedrate control system for 3-dimensional NC milling. Major functional units in the system are a solid modeling module, to which the NC program is input, to simulate the changing in-process part; a machinability database containing physical parameters required in a simulation of the machining process; and a feedrate optimization module to estimate spindle horsepower, cutting force and tool deflection, and adjust feedrate based on constraints of the machine tool and others decided by the user.

DETAILED DESCRIPTION OF THE INVENTION

Figure 1:
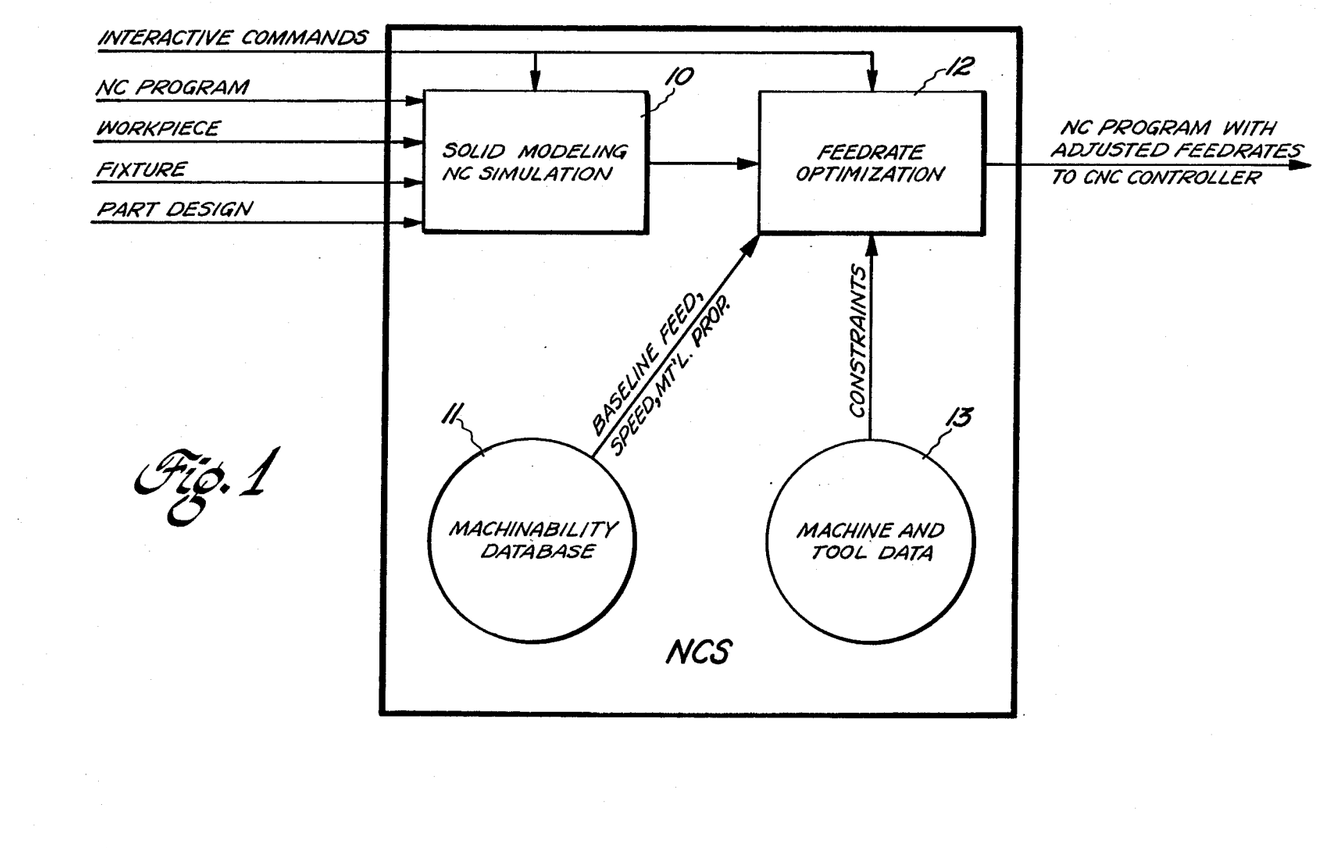
FIG. 1 is a block diagram of a system for simulation and optimization of end milling.

Referring to FIG. 1 and the system diagram of NCS, developed to simulate and provide automated feedrates for end milling, the first major functional unit in the system is a solid modeling and NC simulation module 10. This module supports the modeling of the workpieces and fixtures, which may be modeled by a conventional solid modeling system, interfaces to NC programming systems, and simulates the in-process part geometry. It may be used to model the part geometry for comparing the machined part and the designed part. The second major unit is the machinability database 11; it provides baseline cutting speeds and feedrates as starting points for cutting different materials with different tools. These are obtained from published handbooks and tables or from the experience of the part programmer. In addition, it provides material and physical properties required in the simulation. The cutting force and feedrate optimization module 12, the third major functional unit, estimates the spindle horsepower requirement, cutting force, torque, and tool deflection for the baseline cutting speed and feedrate. It then adjusts feedrate based on the constraints of the machine tool and other constraints decided by the user. The machine and tool data 13 which are the constraints are stored and available to the feedrate optimization module as needed. The NCS system output is the NC program with adjusted feedrates and it is sent to the CNC (computerized numerical control) controller.

Figure 2:
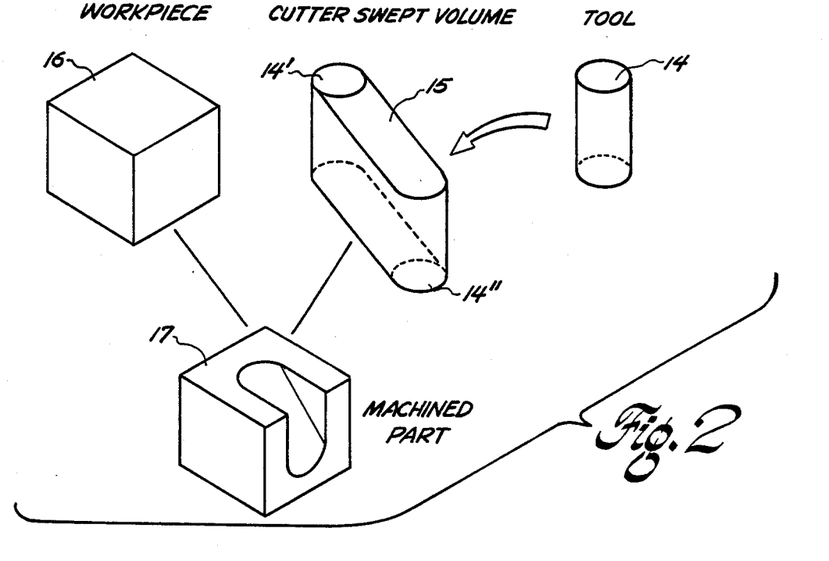
FIG. 2 illustrates the use of solid modeling to simulate in-process part geometry.

Simulating the in-process part geometry is briefly discussed and illustrated in FIGS. 2-5; a fuller explanation, especially the mathematical techniques, is given in the cited published technical papers. Furthermore, software to accomplish this task is sold by GE-Calma Co., a unit of General Electric Co., and is called TPV. In a milling operation the volume is removed from a given workpiece by "sweeping" the cutter. The workpiece and the swept volume of the tool paths are modeled as solids, and the mchined surface is computed by taking a Boolean subtraction between these volumes as shown in FIG. 2. If the tool is a flat-end cylindrical cutter 15 and it is moved linearly in the direction of the arrow, the cutter swept volume is shown at 15. The initial and final positions of the tool are designated 14' and 14''. When the workpiece 16 is block-shaped and the cutter 14 is moved along that tool path, the machined part 17 is produced. Subtracting the tool swept volume from the workpiece volume (a Boolean difference is taken) yields the machined surface.

To model the tool swept volume, the method used is to cmpute its overall boundary surface, the envelope of the swept volume. The envelope consists of two categories of surfaces: (1) the subset of the boundary of the generator (the cutting tool) at the initial position and the final position, and (2) the new surfaces created by the generator during the motion. The first category can be simply computed but the second category is more involved. Let the surface of the moving tool be R=R(u, v, t), where u and v are curve parameters and t is a time parameter. The resulting envelope is calculated by solving $$\left| \frac{\partial R}{\partial u} \quad \frac{\partial R}{\partial v} \quad \frac{\partial R}{\partial t} \right| = 0 \tag{1}$$

A set of critical curves that appear on the envelope are solved by this equation. The problem of computing swept volume is reduced to computing a family of curves. Currently, ball-end cuters, corner-radius cutters and flat-end cutters with 5-axis motions are supported by the system.

Figure 3:
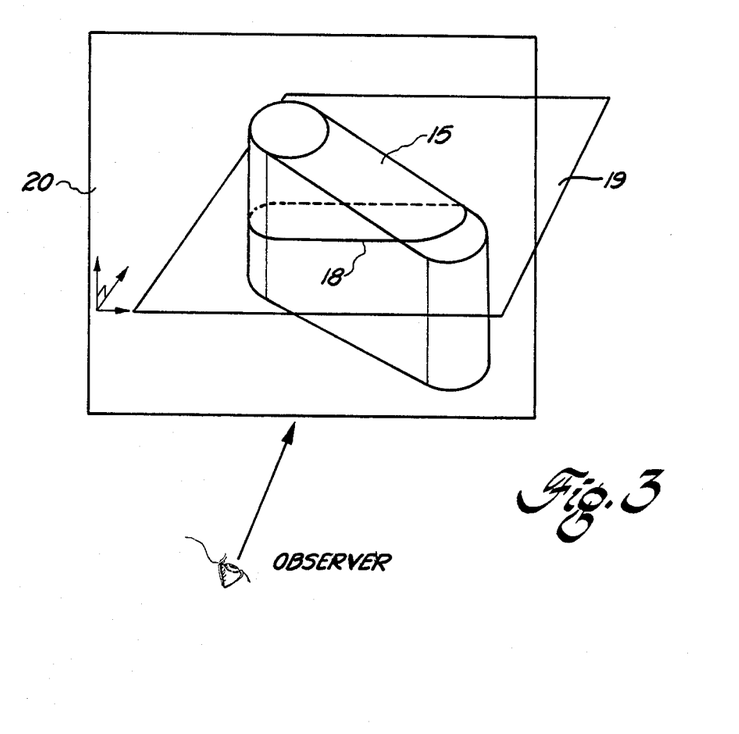
FIG. 3 shows converting the tool swept volume boundary by an efficient scan-rendering procedure to 3-D pixel data.

Considering the large number of swept volumes created by the NC program, the algorithm to generate the in-process part is robust and efficient. The Boolean subtraction from the current workpiece can be performed robustly in 3-dimensional pixel space. As is shown in FIG. 3, the boundary is converted by an efficient scan rendering procedure to the 3-D pixel data. In this figure a scan span 18 is defined at the intersection of a scan plane 19 and the boundary of tool swept volume 15; scan spans are taken at many planes in the z direction. A screen is shown at 20; although a display of the part-in-progress is helpful in visualizing what is going on, the display is not essential to this invention. The advantage of using a scan rendering procedure is that scan line coherence is minimized to minimize computation.

Figure 4:
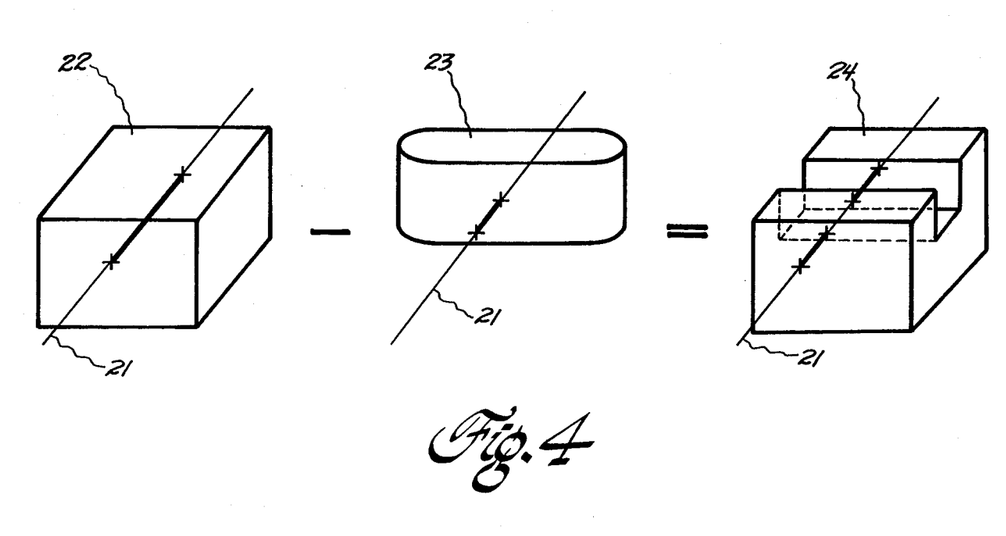
FIG. 4 illustrates the ray-casting technique and Boolean subtraction of solids.

A ray-casting technique is used to compute the resulting in-process part geometry; see S. D. Roth, Computer Graphics and Image Processing, Vol. 18, 1982, for an explanation of ray casting. In essence, the Boolean operation of solids is decomposed into 1-dimensional Boolean operations for each pixel as shown in FIG. 4. In this procedure the intersections of a ray and all operands are first sorted by their depths. The segment of intersections are then merged and the IN/OUT information is classified according to Boolean algebra. FIG. 4 illustrates the Boolean subtraction of solids. A ray 21 intercepts the front and back surfaces of workpiece 22 and tool swept volume 23 at the points marked by x's. The difference between the respective pairs of points yields the part shape along that ray and this procedure is repeated for a large number of rays.

Figure 5:
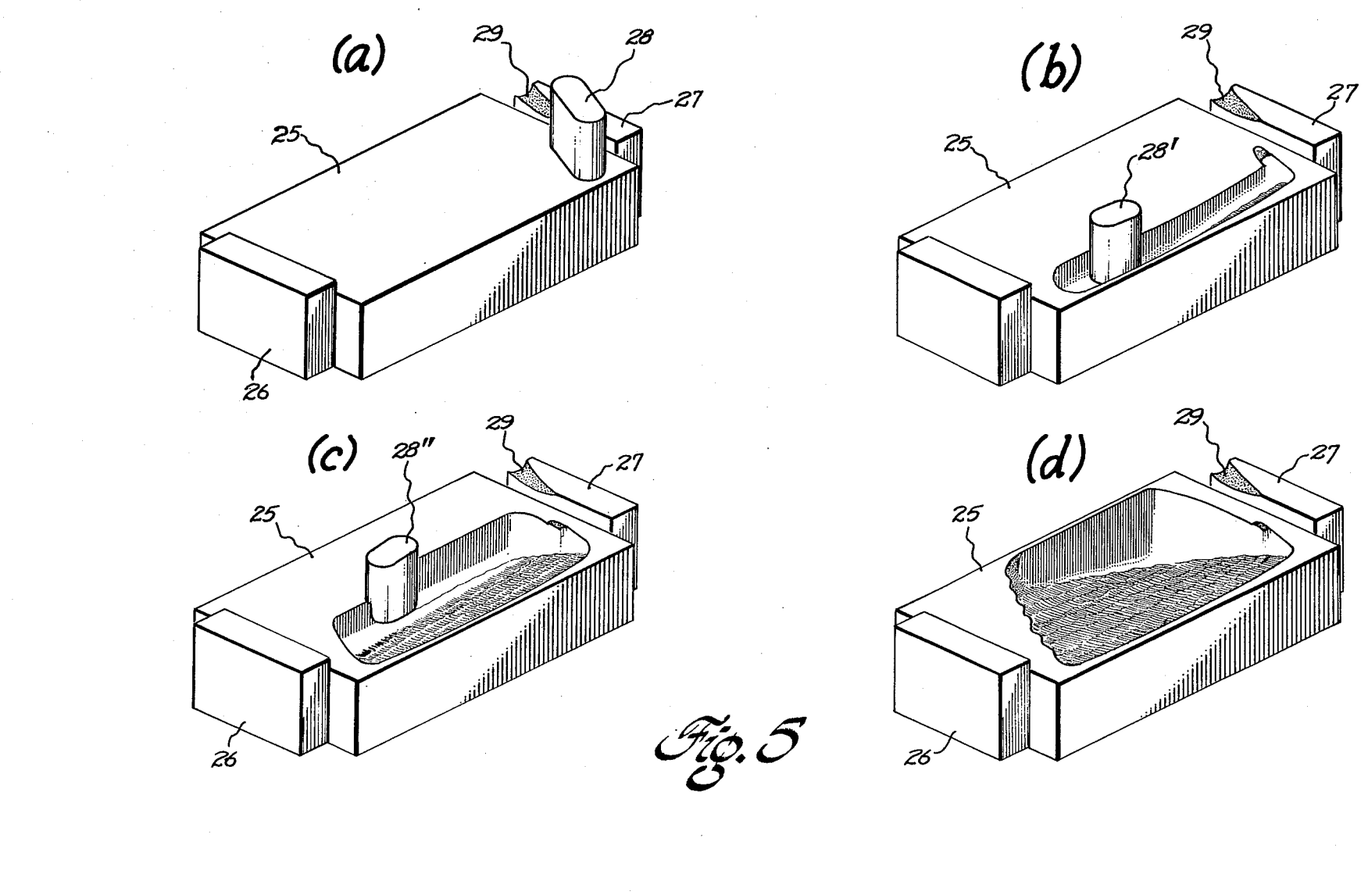
FIG. 5 parts a–d show a sequence of "snapshots" during the simulated machining of a forging die, at the end of the first tool motion step, two intermediate steps, and the final die cavity.

The scan rendering procedure and Boolean subtraction are reasonably fast on minicomputers and may be completed in one second of CPU time for each tool motion. FIGS. 5(a) to 5(d) are a sequence of "snapshots" taken while simulating a machining process on the forging die of a turbine blade. The first is at the end of the initial tool motion step where there is a collision with the fixture. The workpiece 25, fixtures 26 and 27, tool swept volume 28, and collision area 29 are illustrated. The second and third views are intermediate steps in the end milling process where the tool swept volumes 28' and 28'' for the respective tool motion steps are as shown. The fourth is the final die cavity.

Figure 6:
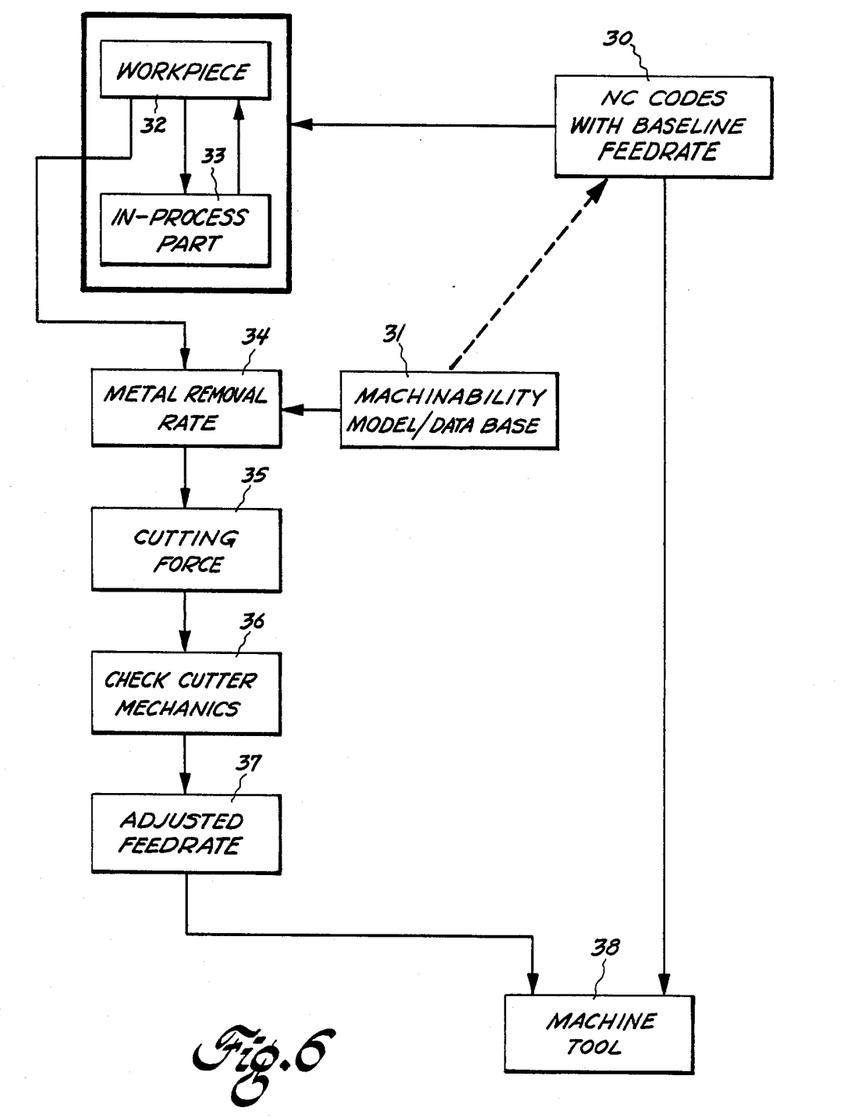
FIG. 6 is a simplified flowchart of the procedure to determine adaptive feedrates from a solid modeling based simulation of the machining process.

FIG. 6 is a simplified flow chart of the steps in the method of determining adaptive feedrates using an off-line simulation of the machining process. The first step shown at 30 is to provide the standard NC codes with a baseline feedrate obtained from the machinability model and database 31. This is the feedrate recommended for the particular cutter and workpiece material, or known from experience. The NC program has blocks of coded instructions which give the trajectory of the cutting tool, the sequence of tool motion steps to follow a tool path. Each block of instructions gives other information needed by the machine tool such as specifying the cutting speed and feedrate. Using the NC program as an input, the next step shown at 32 and 33 is the continuous modeling of in-process part geometry as a solid by subtracting tool swept volume from the current workpiece volume. Step 34 is that the metal removal rate for each step of tool motion is calculated. This is simply the volume of material removed from the workpiece, which can be computed knowing the current in-process part geometry, divided by the time to make the move. Cutting force is computed at step 35, and cutter mechanics are checked at step 36 by computing the tool deflection. To make these calculations certain physical parameters of the material and cutting tool are needed from the machinability database 31; these are stored in a memory. An adjusted feedrate is calculated at 37. Since standard NC programming allows only one feedrate per tool motion, the objective is to determine a best feedrate for each NC instruction, which maximizes productivity without violating the user specified constraints, such as cutting force, tool deflection, machine tool characteristics, and surface finish. The adjusted feedrtes are added to the NC program before transfer of the codes to machine tool 38. A 5-axis milling machine is described in U.S. Pat. No. 4,618,924—Hinds and shown in FIG. 12; a single feedrate is in the NC codes per tool motion step and the CNC controller determines how each axis moves. In principle the technique of adjusting feedrates is applicable to other machine tools such as lathes.

For general cases, the average volume of metal removed, $\dot{M}_r$, can be calculated by an integration over the solid model of the machined part:

$$\dot{M}_r = \int s \, dx \, dy / (d/f) \tag{2}$$

where s is the change of depth for each pixel, dxdy is the area of a pixel, d is the traveling distance in one move, and f is the feedrate. The denominator is the time per tool motion step.

The cutting force calculation is based on the spindle horsepower consumption. The spindle horsepower requirement for a process can be expressed as:

$$HP = U\dot{M}_r \tag{3}$$

where U is the unit horsepower index, and $\dot{M}_r$ is the metal removal rate in in$^3$/min.

The unit horsepower index is a function of microstructure, hardness, cutting speed, average chip thickness, tool geometry, and tool wear. For common materials, U values are available from the literature. For example, "Milling Handbook of High Efficiency Metal Cutting", Carboloy Systems Dept., General Electric Co., 1980, lists rated U of ferrous metals and alloys, high temperature alloys, and non-ferrous metals and alloys. It can also be obtained by monitoring the spindle motor in actual cutting.

For a workpiece with Brinell hardness $B_w$ different from the hardness $B_r$ for which U is rated, the following formula can be used.

$$U_w = (B_w/B_r)^e U_R \tag{4}$$

where $U_w$ is the U of the workpiece, $U_r$ is the U for the material at rated hardness, and e is an exponent (1.9 for cast iron and 0.5 for other materials).

There are some important factors that influence U. It has been shown that within the normal machining range, as cutting speed increases, U decreases. As the true rake angle increases, U also decreases, since the shear angle increases. As the average chip thickness increases, U decreases slightly. Finally, it takes more power to cut with a dull tool than with a sharp one. Consequently, correction factors are suggested for more accurate estimation of horsepower requirement:

$$U = C_s C_r C_t C_w U_w \tag{5}$$

where $C_s$ is the correction for cutting speed, $C_r$ is the correction for rake angle, $C_t$ is the correction for chip thickness, and $C_w$ is the correction factor for a worn tool. In normal operating conditions, these correction factors are in the range between 0.8 and 1.2. Accurate unit horsepower indices are preferred but not crucial for feedrate adjustment.

In order to determine cutting force the spindle horsepower is needed. Given a cutting speed, the average cutting force can be calculated as:

$$F_c = U\dot{M}_r \times 33000/V \tag{6}$$

where $F_c$ is the cutting force in lb, and V is the cutting speed in fpm.

Figure 7:
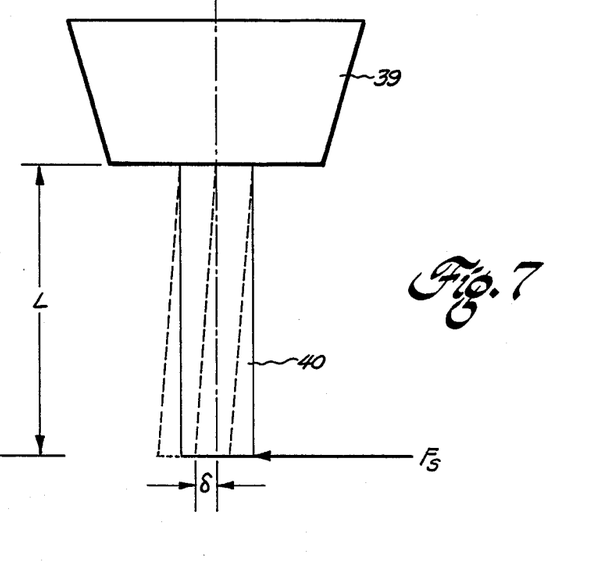
FIG. 7 illustrates a milling cutter in a tool holder and estimation of tool deflection.

To estimate tool deflection, the side thrust force is used. Over a wide range of materials, cutting geometry, and operating conditions, thrust force $F_s$ is approximately equal to 0.5 $F_c$. As shown in FIG. 7, the tool deflection is calculated assuming the tool holder 39 is rigid and the cutting tool 40 is a cantilever beam. For simplification it is further assumed the thrust force is acting on the end and apply the following formula for deflection:

$$\delta = F_s L^3 / 3EI \tag{7}$$

where L is the cutter overhang. E is the modulus of elasticity, and I is the moment of inertia. Tool deflection is a factor that influences the applicable feedrate. Although the exact phenomenon of chatter or tool breakage is more of a dynamic problem than a static one, tool deflection is a simple index reflecting the rigidity of the tool and its tendency to chatter.

An algorithm for adjusting feedrate is now discussed. Basically, there are two parameters which can be adjusted when the cutting force is too high. One can either increase the cutting speed, or decrease the feed, or both. Since the speed has significant impact on tool life and cost, we chose not to dynamically adjust speed. Cutting speed decisions are made at a higher level which takes into account both the production cost and the production rate. A constant speed such as recommended by the machinability database, tool manufacturer and shop experience can be used. In this system, cutting speed only changes when there is a tool change.

An adjusted feedrate is computed for each NC instruction to optimize productivity without violating the user set restraints such as those on cutting force and tool deflection and which may include constraints on machine tool characteristics and surface finish. As shown in FIG. 1, feed per tooth (simply called feed) from the machinability database is used as a baseline feed in adjusting the feedrate. First the baseline feed is assumed as a starting point, and the average values of spindle horsepower, cutting force, and tool deflection in one motion are computed using the formula in the previous section. The feedrate is then set to a maximum that does not violate any constraints.

Figure 8:
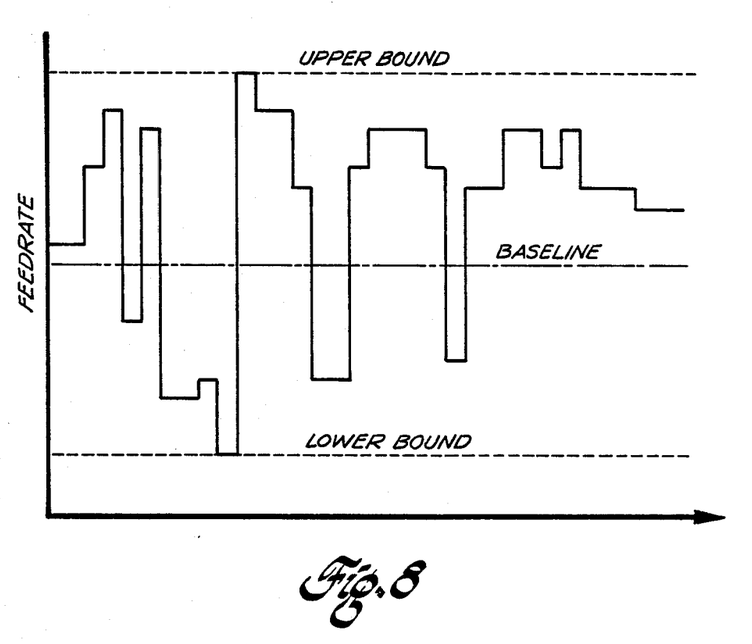
FIG. 8 illustrates a feedrate adjustment limited by upper and lower bounds.

The feed adjustment should be limited within a reasonable range as shown in FIG. 8. An upper bound of feed is set to avoid chipping or breaking of the cutting edge due to excess cutting pressure. A lower bound of feed is also set to avoid cutting a work-hardened layer. From our experience, setting the upper bound to 400% and the lower bound to 25% of the baseline feed performs satisfactorily; this effectively gives us a 16:1 dynamic range for adjusting feedrate. This is a user configurable parameter, however, and other bounds may be used. In addition, when an air-move is detected, a rapid feedrate is set according to the machine capability.

Figure 9:
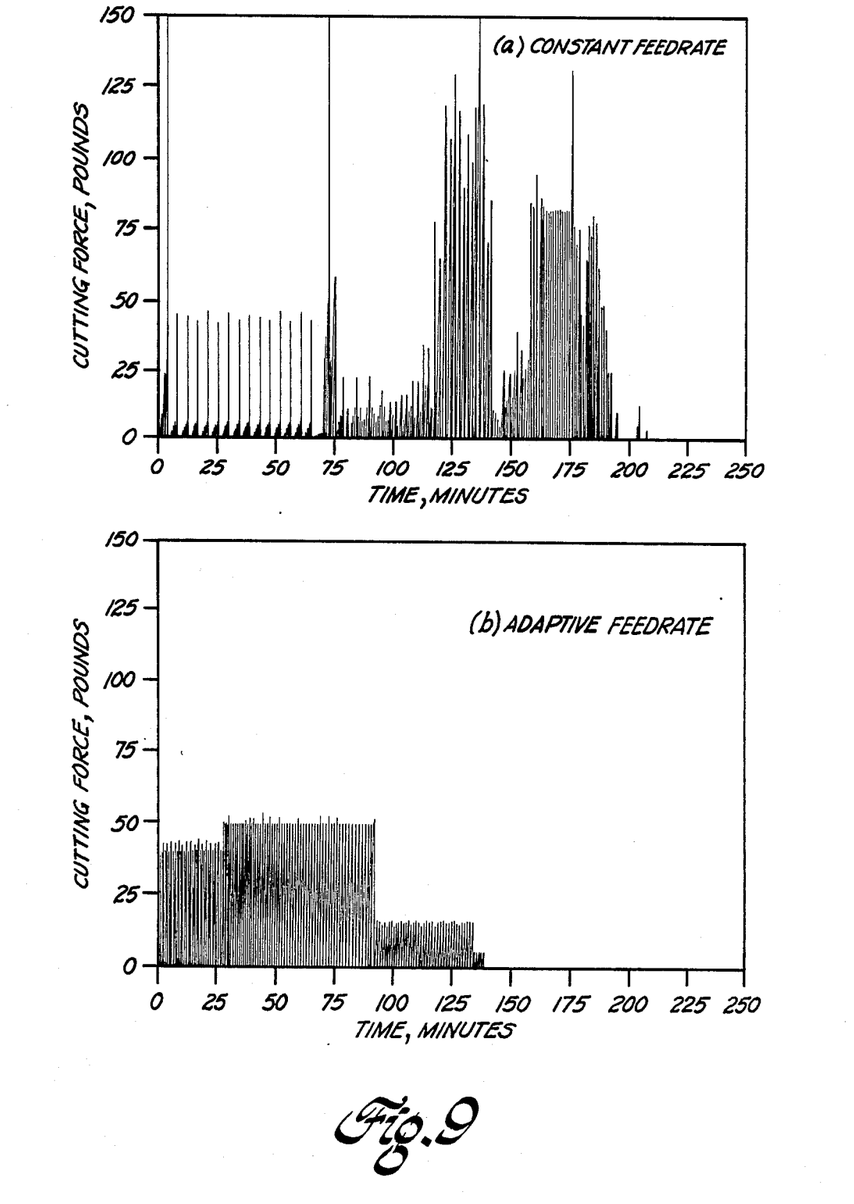
FIG. 9 shows a comparison of cutting force profile and machining time for (a) constant feedrate and (b) adaptive feedrate.

The system has been applied to cut a number of parts in different materials. Shown in FIGS. 9(a) and (b) is the comparison of a typical part cut with constant feedrate and cut with adaptive feedrate. For constant feedrate there is large cutting force variation, while for adaptive feedrate the cutting force profile is smoother. The peaks of high cutting force as eliminated as a result of reduced feedrates for those motions. In the area where cutting load is light, the feedrate is increased to improve productivity. In this example, four levels of cutting force are maintained because four cutters of different sizes are used.

In essence, the software running on a minicomputer acts as an "off-line adaptive controller" before NC codes are downloaded to the CNC controller. The system produces feedrates which maximize the productivity without violating constraints. This approach has no costly hardware investment and maintenance problems. Furthermore, the flexibility of off-line simulation allows look-ahead of machining conditions. For example, a deceleration block is automatically inserted by the system to handle the machine dynamics problem when a drastic feedrate change is expected.

An advantage of this approach is the reduction of machining time. This is due to the increase of feedrates at paths where cutting load would be too light if a conventional feedrate is applied. By comparison, the adaptive feedrate in FIG. 9(b) yields about a 30% saving of machining time.

The off-line simulation also provides a global information in the cutting process. It frees NC programmers to process planners from tedious calculations and guess work, and the can concentrate on making higher level decisions.

This invention is described in the technical paper "Application of Solid Modeling to Automate Machining Parameters for Complex Parts", 19th CIRP International Seminar on Manufacturing Systems, University Park, Pa., June 1–2, 1987 published in the proceedings.

While the invention has been particularly shown and described with reference to preferred embodiments thereof, it will be understood by those skilled in the art that various changes in form and details may be made without departing from the spirit and scope of the invention.

The invention claimed is:

1. A method of determining, by off-line computer simulation of the machining process, an adaptive feedrate for a machine tool, comprising:
   providing an NC (numerical control) program having coded instructions defining a series of cutting tool motions to follow a tool path and machine a workpiece at a chosen baseline feedrate and cutting speed per instruction;
   using said NC program as an input, continuously modeling in-process workpiece geometry as a solid by subtracting tool swept volume from the current workpiece;
   calculating for every tool motion a material removal rate, average cutting force, and cutting tool deflection; and
   selecting, based on said modeling and calculating, an adjusted feedrate per tool motion to optimize productivity without violating user set constraints including cutting force and tool deflection.

2. The method of claim 1 wherein the feedrate adjustment is limited to a bounded range relative to said baseline feedrate.

3. The method of claim 1 wherein said adjusted feedrate is limited to 25–400% of said baseline feedrate.

4. The method of claim 1 wherein said material removal rate is derived from workpiece volume removed and time per tool motion, said average cutting force from spindle horsepower and said cutting speed, where spindle horsepower is a product of the known specific energy to remove unit material and said removal rate, and said tool deflection is dervied from certain physical parameters of the cutting tool and thrust force which is a fraction of said cutting force.

5. The method of claim 1 wherein a 3-dimensional workpiece is machined.

6. The method of claim 1 wherein said user set constraints further include machine tool characteristics and surface finish.

7. The method of claim 1 further comprising adding said adjusted feedrate to said NC program and then transferring said NC program to said machine tool.

8. A method of determining, by an off-line computer simulation of the machining process, an adaptive feedrate for NC (numerical control) end milling, comprising:
   providing an NC program having coded instructions defining a series of cutting tool motion steps to follow a tool path and machine a workpiece at a chosen baseline feedrate and cutting speed per instruction;
   using said NC program as an input, continuously modeling in-process workpiece geometry as a solid by subtracting tool swept volume from the current workpiece;
   calculating a metal removal rate from the workpiece volume removed and time per tool motion step;
   calculating average cutting force from spindle horsepower, a product of the known specific energy to remove unit material and said removal rate, divided by said cutting speed;
   calculating cutting tool deflection from certain physical parameters and that thrust force is approximately half said cutting force; and
   selecting, based on said modeling and said calculating of rate, force, and deflection, a maximum adjusted feedrate per NC instruction to optimize productivity without violating user set constraints including cutting force and tool deflection.

9. The method of claim 8 wherein said adjusted feedrate is no more than 400% or less than 25% of said baseline feedrate.

10. The method of claim 8 wherein 3-dimensional end milling is performed.

11. The method of claim 8 wherein said time per tool motion step used in calculating said metal removal rate is the length of a move divided by said baseline feedrate.

12. A system to provide adaptive feedrate control for 3-dimensional NC (numerical control) milling, comprising:
   an NC program having coded instructions ordering a series of cutter tool motions to follow a tool path and machine a workpiece at a chosen baseline feedrate and cutting speed per instruction;
   a solid modeling means, to which said NC program is presented, for continuously simulating a changing in-process workpiece geometry by modeling said workpiece and a volume swept out by the tool path as solids and subtracting the swept volume from the changing workpiece;
   means for providing a machinability database containing physical parameters required in a simulation of the machining process; and
   a cutting force and feedrate optimization module comprised of means for calculating for every tool motion, based on said simulation and physical parameters, a metal removal rate, spindle horsepower, average cutting force, and tool deflection; means for determining, from said calculated rate, horsepower, force, and deflection, an adjusted feedrate to optimize productivity without violating predetermined user set constraints including cutting force and tool deflection; and
   means for adding said adjusted feedrate to said NC program.

13. The system of claim 12 wherein said means for calculating the metal removal rate comprises means for computing an amount of workpiece volume removed and time per tool motion; means for computing said average cutting force from said spindle horsepower, which depends on said metal removal rate and a known specific energy to remove unit material, and means for computing said cutting speed; and said tool deflection from thrust force and known physical parameters of the cutter, given that thrust force is a fraction of said cutting force.

14. The system of claim 12 wherein said means for determining an adjusted feedrate comprises means for determining an adjusted feedrate that is limited to a bounded range relative to said baseline feedrate.

15. The system of claim 12 where said user set constraints further include machine tool characteristics and surface finish.

* * * * *